A. C. MEEKER.
INSECTIFUGE VAPORIZER.
APPLICATION FILED AUG. 7, 1909.
965,392.
Patented July 26, 1910.
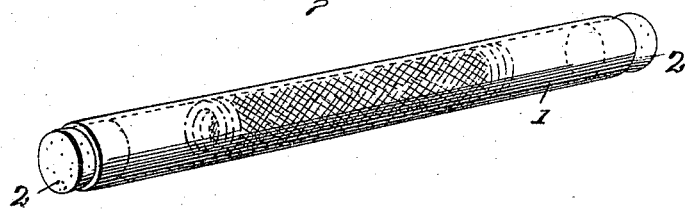
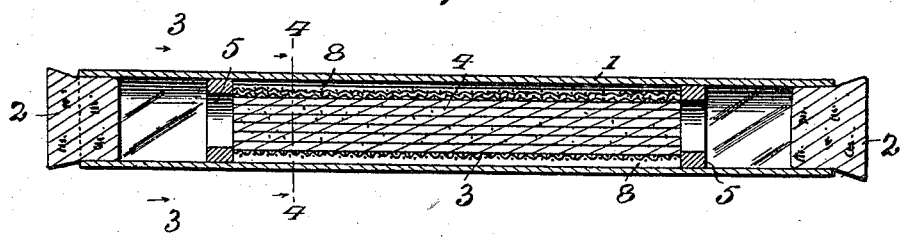
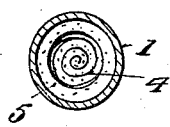
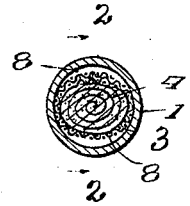
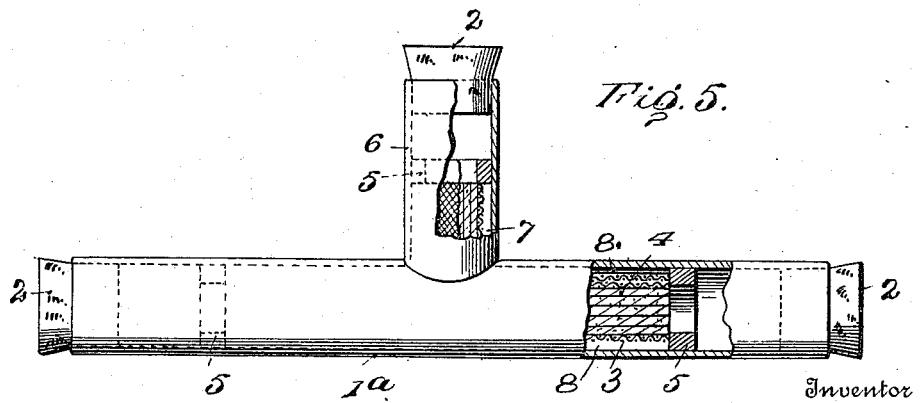
Witnesses
W. P. Woodson
Juana M. Fallin
Inventor
A. C. Meeker
By
Attorneys

UNITED STATES PATENT OFFICE.

ALLEN C. MEEKER, OF MADRID, NEW YORK.

INSECTIFUGE-VAPORIZER.

965,392.  Specification of Letters Patent.  Patented July 26, 1910.

Application filed August 7, 1909.  Serial No. 511,719.

*To all whom it may concern:*

Be it known that I, ALLEN C. MEEKER, citizen of the United States, residing at Madrid, in the county of St. Lawrence and State of New York, have invented certain new and useful Improvements in Insectifuge-Vaporizers, of which the following is a specification.

This invention comprehends certain new and useful improvements in devices of that type which are adapted to contain a charge of an insectifuge and permit the odor thereof to be freely disseminated so as to repel insects.

The object of the present invention is a simple, durable and efficient construction of insectifuge vaporizer which is designed particularly for use when packing away apparel, to keep the same free from moths, and which is arranged to effectually contain a liquid charge in such a manner as to insure against the same coming into contact with and possibly soiling the garments.

With this and other objects in view as will more fully appear as the description proceeds, the invention consists in certain constructions and arrangements of the parts that I shall hereinafter fully describe and then point out the novel features thereof in the appended claims.

For a full understanding of the invention and the merits thereof, and to acquire a knowledge of the details of construction, reference is to be had to the following description and accompanying drawing, in which:

Figure 1 is a perspective view of an insect repellent constructed in accordance with my invention; Fig. 2 is an enlarged longitudinal section thereof on the line 2—2 of Fig. 4; Fig. 3 is a transverse section on the line 3—3 of Fig. 2; Fig. 4 is a similar view, the section being taken on the line 4—4 of Fig. 2; and, Fig. 5 illustrates a modified form hereinafter specifically described.

Corresponding and like parts are referred to in the following description and indicated in all the views of the drawing by the same reference characters.

My improved insectifuge vaporizer consists essentially of a hollow casing or holder 1 that is preferably of tubular form and is made of glass or other suitable material. The casing is open at its opposite ends in order to admit of the free circulation of air therethrough to effect the dissemination of the odor of the charge, said ends of the casing being closed by suitable stoppers 2 when the device is not in use.

Positioned within the casing, intermediate of the ends thereof, is a foraminous inner tube 3 that is open at its opposite ends and is split longitudinally so as to be susceptible of being expanded and contracted to fit casings of different sizes and to be retained frictionally therein. In practice it has been found particularly desirable to construct the inner tube from a single piece of wire cloth. The inner tube incloses absorbent material 4 that is preferably in the form of a roll of flannel or similar cloth, although not necessarily so. The absorbent material is thoroughly saturated with the insectifuge which is in the form of a suitable volatile liquid, as for instance, oil of cedar. The wire cloth forming the inner tube 3 acts throughout its length to retain the rolls of the absorbent material. As a precautionary measure to prevent the insectifuge from possible oozing out at the ends of the inner tube, centrally perforated disks 5 of cork are fitted snugly within the casing in abutting relation to said ends of the inner tube. It is to be observed that in addition to the above function, the disks also serve to hold the absorbent material against longitudinal displacement from the inner tube.

In the practical use of the invention, the stoppers 2 are removed from the opposite ends of the casing, and the latter is placed in a chest or other receptacle in which apparel is to be packed. The air is thus permitted to circulate through the casing and the absorbent material contained therein, whereby to become laden with the odor of the charge and to disseminate the same through the apparel, to effectually keep the latter free from moths and similar pests. Attention is also directed to the fact that a garment which is not packed away may be protected from insects by placing one or more of my improved devices in the pockets thereof.

From the foregoing description in connection with the accompanying drawing, it will be apparent that I have provided an improved insect repellent which is quite attractive and particularly efficient in use; which contains the liquid insectifuge without any danger of the same becoming spilled on the clothing; which embodies to a marked degree the characteristics of simplicity and durability, and which consists of comparatively few parts that may be easily and cheaply manufactured.

Another embodiment of my invention is illustrated in Fig. 5, wherein a tubular branch 6 is formed integral with the casing 1ª and projects perpendicularly therefrom and communicates with the same near its middle point, the casing being thus substantially T-shaped. If desired, the branch may be provided with a supplementary inner tube 7 of wire mesh that is substantially similar to the tube 3 positioned in the main portion of the casing. The outer end of the branch is open, although adapted to be closed by a stopper when the device is not in use. This form of the invention has been found very efficient in practice, as a thorough circulation of air is afforded through the casing.

By referring particularly to Figs. 2 and 4, it is to be observed that the inner tube 3 is flattened on opposite sides so as to be spaced apart from the inner surface of the casing 1 to afford circumferential chambers 8, whereby a thin film of liquid is permitted to adhere to the outer surface of the said flattened portions of the inner tube so that air circulating through the casing becomes quickly laden with the charge. In this connection, attention is directed to the fact that the centrally perforated disks 5 conform to the internal contour of the casing and fit snugly therein in order to close the ends of the circumferential chambers 8 and insure against possible leakage of the liquid therefrom and to further serve to brace the inner tube against movement.

Having thus described the invention, what I claim is:—

1. As a new article of manufacture, a vaporizer comprising a hollow elongated casing open at its opposite ends, a tubular receptacle open at its opposite ends and fitted frictionally within the casing with its ends terminating short of the ends thereof, the receptacle being split longitudinally throughout its entire length and having its split edges overlapping, whereby to be adapted to be expanded or contracted to fit casings of different sizes, absorbent material contained in the receptacle and adapted to be saturated with a volatile liquid, and removable members separate from the receptacle and fitted frictionally within the opposite end portions of the casing and extending across and abutting against the adjacent ends of the receptacle, whereby to serve both to maintain the receptacle against longitudinal displacement within the casing and to hold the absorbent material against displacement from the receptacle, the said members being formed with perforations communicating with the ends of the receptacle to admit of the passage of air therethrough.

2. As a new article of manufacture, a vaporizer comprising a hollow elongated casing open at its opposite ends, a hollow elongated receptacle of foraminous material open at its opposite ends and positioned within the casing with its ends terminating short of the ends thereof, the receptacle being spaced apart from the inner surface of the casing to provide a plurality of longitudinally extending peripheral chambers, and being engaged frictionally with the inner surface of the casing intermediate of the chambers, whereby to separate the chambers peripherally and to assist in maintaining the receptacle in position within the casing, absorbent material contained in the receptacle and adapted to be saturated with a volatile liquid, and removable members conforming to the internal contour of the casing and fitted frictionally in the opposite end portions thereof in abutting relation to the adjacent ends of the receptacle, the members closing the ends of the peripheral chambers and also serving to maintain the receptacle against longitudinal displacement within the casing and to hold the absorbent material against displacement from the receptacle, the said members being formed with perforations communicating with the ends of the receptacle to admit of the passage of air therethrough.

3. As a new article of manufacture, a vaporizer comprising a tubular casing open at its opposite ends, a tubular receptacle of foraminous material open at its opposite ends and positioned within the casing with its ends terminating short of the ends thereof, the receptacle being split longitudinally, whereby to be adapted to be expanded and contracted to fit casings of different sizes, the receptacle being also flattened longitudinally on opposite sides to be spaced apart from the inner surface of the casing to provide longitudinal peripheral chambers and being engaged frictionally with the inner surface of the casing intermediate of the chambers, absorbent material contained in the receptacle and adapted to be saturated with a volatile liquid, the removable members conforming to the internal contour of the casing and fitted frictionally therein in abutting relation to the adjacent ends of the receptacle, the members closing the ends of the peripheral chambers and also serving to maintain the receptacle against longitudinal displacement within the casing and to hold the absorbent material against displacement from the receptacle, the said members being formed with perforations of less diameter than the receptacle and communicating with the open ends thereof to admit of the circulation of air therethrough.

In testimony whereof I affix my signature in presence of two witnesses.

ALLEN C. MEEKER. [L. S.]

Witnesses:
 JOHN HAIG,
 GUY P. HORSFORD.